Dec. 1, 1942.  J. GUERCIO  2,303,633
FILM GATE FOR PICTURE PROJECTING MACHINES
Filed May 19, 1941  2 Sheets-Sheet 1
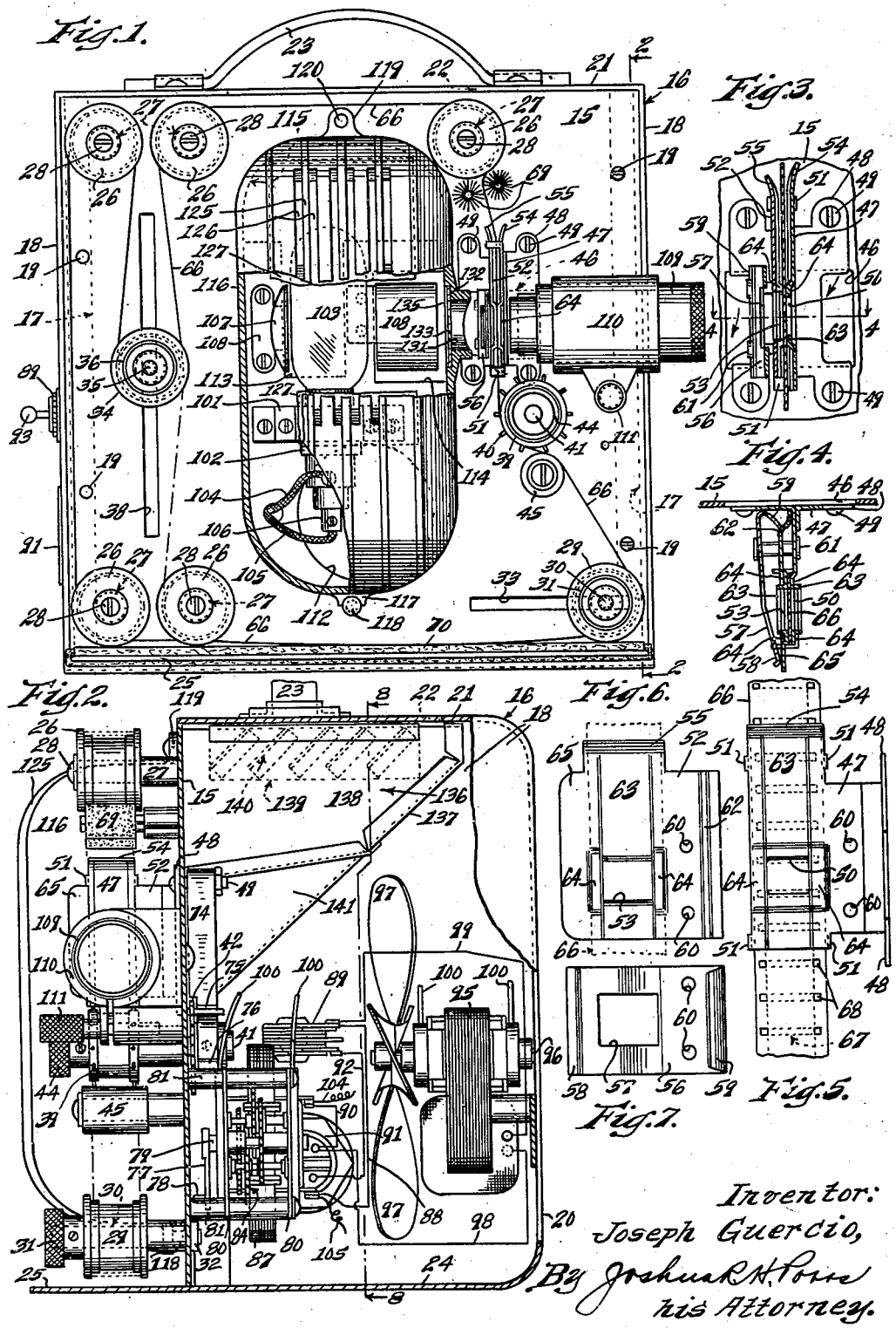
Inventor:
Joseph Guercio,
By Joshua R. H. Potts
his Attorney.

Dec. 1, 1942.  J. GUERCIO  2,303,633
FILM GATE FOR PICTURE PROJECTING MACHINES
Filed May 19, 1941  2 Sheets-Sheet 2
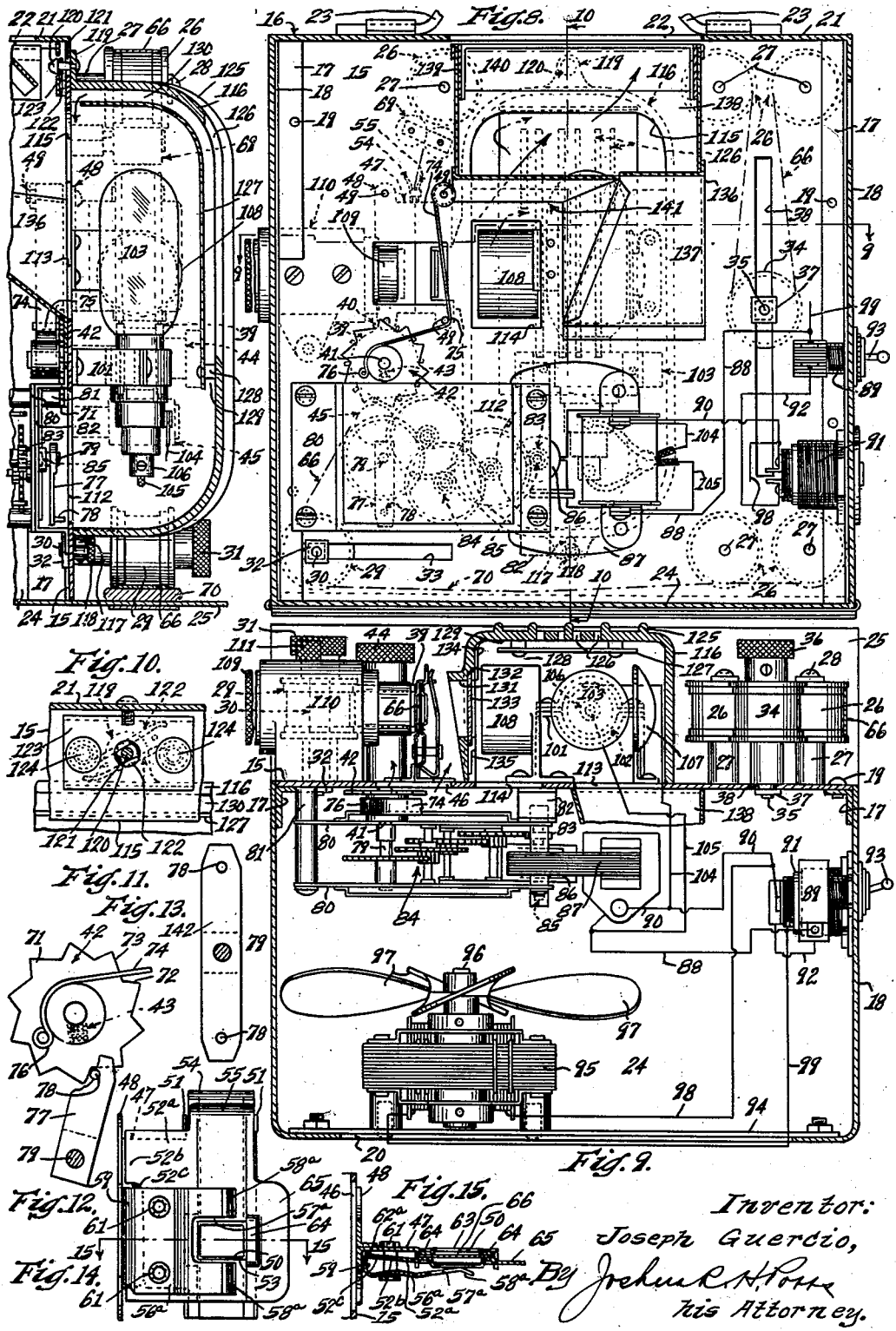
Inventor:
Joseph Guercio,
By Joshua R. H. Potts
his Attorney.

Patented Dec. 1, 1942

2,303,633

UNITED STATES PATENT OFFICE 2,303,633

FILM GATE FOR PICTURE PROJECTING MACHINES

Joseph Guercio, Chicago, Ill.

Application May 19, 1941, Serial No. 394,073

9 Claims. (Cl. 88—17)

This invention relates to a film gate and guiding means for picture projecting machines and more specially to a machine for the projection of a series of still pictures from a film to advance the film one picture or panel at each intermittent operation for still exposure at each interval between such operations and so that the duration of exposure may be as long or as short as desired, say seven seconds or the period cut in half to three and one-half seconds by way of example.

Another object of the invention is to provide an improved film gate and cooling means for a picture projecting machine or device for the projection of a succession of still pictures from a continuous strip film with relatively short periods of time between exposures so that a certain number of pictures, panels or frames may be exposed in a given period of time, say 130 pictures or frames in 15 minutes for exhibiting to audiences, window display and the like so that certain information may be brought before the public eye.

Another object of the invention is to provide a novel and simple film gate and cooling means for the lamp, film gate and film by which the film is exposed to the light rays for projection upon a screen at the film aperture which permits the film to be easily fed into position and which will pass the joint where the ends of a strip are overlapped to form a continuous film or at any point in the length thereof so that the film will not be disrupted or broken at the joint in moving through the gate.

Another object of the invention is to provide a novel picture projector in which the mechanism including the film gate is mounted as a unit almost in its entirety upon a single wall or plate to facilitate and simplify the manufacture and assemblage thereof and to render the parts more readily accessible than heretofore, and in which the working parts are, with the exception of the electrical contrivances, including the driving motor, geneva or star wheel movement and an efficient cooling arrangement or system including a fan and its motor, all exposed at one side of the wall or panel and in which said wall or panel is adapted to form a closure for one side of a case in which the other parts of the device are mounted in a substantially box like structure having a switch controlling an electrical circuit for the operation thereof which, however, may be in the form of an extension cord with a switch for remote control and which may be connected to a source of electrical energy by plugging into a wall socket or house wiring at any convenient point.

Still another object of the invention is to provide a novel arrangement for causing a continuous movement of cool air through the machine and particularly around the light source and the film at the film gate where the film is particularly subject to friction so as to reduce the temperature at these points and eliminate the hazards or dangers of combustion or fire.

Still another object of the invention is to mount the parts and mechanism, including the film gate, lamp, lens systems, case and its plate or wall forming a side or panel for carrying the mechanism including the lamp and objective or focusing lens in such a way as to arrange the parts in a relation to render them more accessible and facilitate manufacture.

Another object of the invention is to provide novel means for removing dust or foreign matter from the film during its travel and prior to passing into the film gate for exposure and projection of the picture or advertising matter thereon, said means including brushes adjacent the film gate and a felt or other cleaning pad mounted on an extension of the bottom or base of the machine constituting a part of the case which may be provided with suitable means for mounting the machine on a tripod, if desired, although it may be mounted upon any other suitable elevated support for use.

Further objects and advantages will appear and be brought out more fully in the following specification, reference being had to the accompanying drawings, in which:

Fig. 1 is a side elevation of a picture projecting machine in accordance with an embodiment of my invention, the same being shown partly broken away and in section;

Fig. 2 is a transverse sectional elevation taken on the line 2—2 of Fig. 1 but looking at the front end of the objective lens assembly;

Fig. 3 is an enlarged fragmentary vertical sectional elevation of the film gate structure;

Fig. 4 is a horizontal sectional view taken on the line 4—4 of Fig. 3;

Fig. 5 is a front elevation looking at one side of a fixed aperture plate constituting a part of the film gate and showing a section of a film strip in position;

Fig. 6 is an inside elevation of a spring pressure aperture plate also forming a part of the film gate;

Fig. 7 is an inside elevation of a pressure spring forming part of the film gate;

Fig. 8 is a vertical sectional elevation taken longitudinally on the line 8—8 of Fig. 2;

Fig. 9 is a horizontal sectional view taken on the line 9—9 of Fig. 8 with the lamp in elevation;

Fig. 10 is a transverse vertical sectional view taken on the line 10—10 of Fig. 8;

Fig. 11 is a fragmentary vertical sectional elevation showing the latch fastening for the cooling chamber hood for the lamp;

Fig. 12 is a detailed elevation showing the cam and operating arm of the geneva or star wheel movement;

Fig. 13 is an elevation of a double or cross arm for the geneva or star wheel movement;

Fig. 14 is a view similar to Fig. 4 of a slight modification of the film gate; and Fig. 15 is a face view looking at the back of the film gate spring pressure aperture plate and pressure spring in the modified form.

This application is a continuation in part of my application for Picture projecting machines, Serial No. 368,569, filed December 5, 1940.

Referring more particularly to the drawings, the picture projecting machine is shown as comprising a front wall or plate 15 which forms a vertical side or panel for a box or case 16 of relatively rectangular form with the panel running longitudinally thereof. This panel forming wall or plate which mounts the mechanism unit of the device is removably secured in position against a pair of angle members 17 at the vertical front edges or corners of the case or box within the walls thereof and particularly the side walls 18 viewing the panel facewise, which form the front and rear of the case as by screws 19 passing through suitable apertures in the wall 15 and threaded apertures in the angle members 17 at their inwardly projecting flanges. The back of the case is designated at 20 and may be in the form of an open wall formed with or separate from the walls 18 and a top wall 21, which latter is provided with a rectangular or other opening 22. A handle 23 is provided on the top wall and is shown spanning the opening 22. A bottom wall or base is designated at 24 and is provided with a front or base extension forming a plate 25 for a purpose to be hereinafter made apparent. The bottom wall or base may be provided with suitable means for mounting the device upon an easel or other horizontal support in an elevated position for projecting the pictures or advertising matter upon a suitable screen placed at a proper distance therefrom.

As before stated, the front panel formed by the wall or plate 15 mounts a unit of the device constituting primarily the film carrying and picture projecting mechanism which, for the most part, is assembled upon this single wall to be later attached to the box or case in making up the complete machine. The wall 15 is thus adapted to be mounted at the front of the case resting upon the base extension 25 and is adapted to support or have secured thereto a plurality of film guide rollers 26 of any suitable number which may be extended indefinitely according to the length of film to be exposed as thus supported. These rollers are supported by bolts or stud shafts 27 extending out horizontally from the wall at right angles and secured thereto as by lock screws 28 with suitable spacing sleeves between the rollers and the wall. As shown, these rollers are fixed and three upper rollers and two rollers are illustrated, the forward upper roller being considerably spaced from the two pairs of upper and lower rear rollers so that the film may be passed around the same in serpentine form or as a continuous loop with suitable means for taking up slack according to the length of the film. An adjustable horizontal lower guide roller 29 is also provided on the wall 15 near the base extension 25 at the front and is mounted on an adjustable stud 30 secured to the wall 15 and having a knurled finger piece or knob in the form of a nut 31 which engages a flanged nut or a locking plate 32 at the back of the plate 15 after passing through the latter. The flanged nut is provided at the back of an elongated horizontal slot 33 in the wall 15 and the flanged nut 32 preferably has flat faces adapted to engage the elongated slot 33 and above and below with a portion projecting into the slot at the hub to take the reduced end of the shaft so as to support the roller in a true horizontal position together with the knob thereon. A similarly mounted vertical adjustable roller 34 is mounted between the upper and lower pairs or series of rollers 26 at the back, it being understood that the number of rollers 26 may be varied according to the length of the film as previously explained. This roller 34 is mounted on and secured to the wall 15 by an adjustable stud shaft or bolt 35 having a knurled knob portion 36 and the stud shaft being provided with a flanged nut 37 having flat faces adapted to engage an elongated vertical slot 38 formed in the wall 15 with portions engaging on opposite sides of the slot through the medium of the flanged nut 37 at the back in the same manner as the bolt or stud shaft 30 for adjustment to tension or take up slack in the film in the manner shown in Fig. 1 of the drawings.

A film feeding sprocket roller 39 having sprocket teeth 40 is secured to a shaft 41 which extends through the wall 15 and is provided with a feeding cam or star wheel 42 secured thereto by a set screw 43. A hand operating knurled knob 44 is provided on the shaft 41 and may be secured by threading or a set screw as shown in Fig. 2. An idle guide roller 45 is positioned beneath the sprocket roller 39 so that the film, after passing under the feeding roller, passes over the guide roller and then to the roller 29.

Slightly above and in rear of the sprocket or feeding roller 39, an opening 46 is provided through the wall 15 and a film gate or guiding means including a fixed aperture plate 47 is secured vertically across said opening centrally leaving air escape openings on each side as seen in Figs. 1, 2 and 3 through the medium of flanges 48 on opposite sides thereof held by screws 49. This plate is provided with a rectangular film aperture 50 and upper and lower pairs of ears 51 to guide the film. A pressure aperture plate 52 having a similar registering aperture 53 is held against the plate 47 at the back and the latter plate has a forwardly curved upper lip 54 while the plate 52 has a rearwardly curved shorter lip 55 to extend between the upper ears 51 on the plate 47. An apertured pressure spring 56 is provided at the back of the plate 52 and has an aperture 57 to register with the apertures 50 and 53 in the respective plates 47 and 52 and an angular pressure end 58 to engage against the outer portion of the loose plate 52 beyond and above and below the apertures to hold the plates uniformly together or the plate 52 against the fixed plate 47. The opposite or inner end 59 of the spring 56 is turned or curved forwardly and outwardly and has a pair of holes 60 registering with corresponding holes in the plates 47 and 52 to take hollow rivets 61 which are anchored on the plate 47 while the plate 52 and the spring 56 are loose to ride, slide or pivot thereon although the spring is held from total displacement by upsetting the inner or rear ends of the rivets. The turned end 59 is adapted to ride, fulcrum or pivot on a bent seat 62 provided along the inner edge of the plate 52 and both of the plates 47 and 52 are provided with oppositely pressed channels 63 opposing one another and on opposite sides of the apertures with inwardly pressed ribs 64 which result in a slight spacing of the plates particularly at the apertures so that only the edges of the film engage the plates at such points thereby permitting the film to travel smoothly and preventing obstruction or catching of the overlapped ends of a film strip at such points where the ends of the strip are joined to form a continuous film or at points of mending. In feeding or removing the film from between plates, it is necessary to separate the pivoted plate 52 from the fixed plate 47 and for this purpose, the pivoted plate is provided with a lip or finger engaging extension 65 which projects out beyond the edge of the plate 47 so that pressure may be applied against the action of the spring 56 for this purpose. The film is designated at 66 and is provided with the usual pictures or advertising matter 67 arranged in panels or frames and along opposite edges with a series of spaced holes 68 for the sprocket teeth 40 of the roller 39 so that as the latter is driven, the engagement of the teeth with the holes will advance the film. It is also desirable to remove any dust or foreign matter from the film strip and for this purpose, a pair of brushes 69 are mounted with their bristles in interlocking relation beneath and slightly forwardly of the upper and forward roller 26 and an elastic felt band 70 may be mounted upon the base extension 25 in position to engage the film beneath the lower rollers 26 and 29, thus keeping the film clean to insure clear pictures.

The feeding cam or star wheel 42 constitutes part of a geneva or star wheel movement to intermittently advance the film between intervals of exposure at any speed desired and, as previously explained, the film may be exposed for seven seconds or three and one-half seconds or for other suitable time intervals between advancements. For this purpose, the feeding cam 42 is provided with teeth 71 the number of which is the same as the pairs of teeth 40 of the film feeding sprocket roller 39 and as the continuous film 66 has a succession of pictures 67 and pairs of sprocket holes 68 which are spaced along the film by the same spacing as the teeth 40 of the feed roller 30, the intermittent rotation of the roller 39 is so arranged by the mechanism hereinafter described in conjunction with the teeth 71 of the feeding cam or star wheel 42 to pass the film past the apertures 50, 53 and 57 and register the same therewith or center the picture relative to the film gate aperture as the film is intermittently fed or advanced at equal intervals of time of movement and, while stationary, for exposure. It will also be clear that the roller 29 is so adjustable with or without adjustment of the roller 34 to provide appropriate tension for the film 66 which is an endless unit.

As may be clearly seen from Figs. 8 and 11 of the drawings, the feeding cam wheel 42 is provided with the teeth 71, the number of which is the same as the pairs of sprocket teeth 40, and each tooth 71 has an abutment surface or short edge 72 which is substantially radial and a flat clearance surface or long edge 73 which is substantially circumferential although both surfaces or edges are somewhat tangential to the periphery. The adjacent surfaces 72 and 73 form notches or grooves therebetween, the intermediate crotch being of angular formation and controlling by the depth thereof the degree of movement imparted to the feeding cam as will be later described. A centering or friction spring 74 is mounted on one of the screws 49 and extends down from its anchored end on said screw under another one of the screws 49 therebeneath as at 75 and is then formed with an angular or curved end 76 disposed over and against the hub of the cam wheel 42 so as to friction the latter and center the teeth as well as the picture panels or frames 67 with respect to the film apertures in the film gate as previously described. A crank arm 77 of the driving mechanism or motor unit is provided with a pin 78 extending laterally to engage the abutments 72 past the clearance surfaces 73 and is mounted on a rotatable shaft 79 between frame members 80 forming spaced plates for supporting the motor unit at the lower portion of the front plate or wall 15 at the inside through the medium of posts 81 which engage the wall or panel 15 at one end of the frame 80 and a bracket 82 at the other end, which bracket is also supported by means of bolts or screws through the front wall or plate 15 forming a panel for the case upon which the mechanism is supported. A pinion 83 of a reduction gear train 84 is mounted between the frame members or spaced plates 80 and engages an adjacent gear of the gear train 84. This pinion is mounted on an armature shaft 85 which also carries an armature 86 of a motor 87 also supported by the plates 80 including the usual field magnets and windings or coils if an electric motor is used, or other suitable form of driving or clock mechanism.

The circuit including the motor has a wire 88 leading from the motor 87 to a switch 89 on the side or rear wall 18, although this switch may be mounted on the end of an extension cord for remote control as is common in the art, if desired. A wire 90 also leads from the motor to a plug socket 91 also shown mounted on the wall 18 for connection with an extension cord from a wall socket or house wiring to supply current. A wire 92 leads from the other side of the switch 89 to the socket 91 and the switch is provided with a lever or button 93. A cross bar 94 may be mounted at the back or side 20 opposite the wall or plate 15, this side being open in the form shown and spanned by the cross bar suitably anchored at its ends to the inturned ends of the walls 18. A fan 95 of the electrical type is mounted upon the cross bar 94 and the armature shaft 96 thereof carries a cooling fan 97 at its inner end directed toward the mechanism previously described. A wire 98 leads from the motor to the socket 91 conjointly with the wire 90 and a wire 99 leads from the other side of the motor to the switch 89 conjointly with the wire 88, the switch being suitably insulated from the metal or other material of the case 16 so that by closing the switch both the driving and fan motor will be placed in operation. The motors may be provided with oiling tubes 100 which for convenience may be led through the top of the case to facilitate oiling the motors.

A bracket 101 is also mounted at the outside of the wall 15 to support a socket shell 102 in a vertical position to take a projection lamp 103, power for which is supplied by wires 104 and 105, the first of which leads to the socket and the second of which leads to the contact post 106 or point with which the single contact point of the lamp engages. These wires are in turn connected to the wires 90 and 88, respectively, so that the circuit may be controlled by the switch 89 when the motors are placed in operation. A reflector 107 is also mounted on the wall 15 in back of the lamp 103 to reflect the light rays forwardly through a condensing lens system 108 of any suitable design also mounted on the wall 15 and after passing through the film gate aperture to project the picture thereof upon a suitable screen through an objective or focusing lens assembly 109 also of any suitable design and constituting a focusing medium. The objective lens assembly 109 is supported by a tubular bracket or split clamp 110 mounted horizontally at the front of the wall 15 and provided with a knurled clamp screw 111 for bringing the spaced portions or jaws of the clamp into frictional engagement with the casing of the objective lens to hold the same in adjusted focusing position.

A bottom opening 112 is provided in the wall 15 and is shown as a circular opening adjacent the socket of the lamp and the bracket 82 which supports one end of the motor frame 80 and a vertically elongated slot or opening 113 is also provided in the wall 15 adjacent the lamp 103. An opening 114 is provided adjacent the condensing lens system 108 and the opening 113 communicates with a comparatively wide and substantially semicircular horizontal opening 115 at the top similarly provided through the wall 15. The purpose of these openings is to permit the air blast from the fan or the cool current thereof to pass through the openings to maintain the adjacent parts, especially lamp 103 and lens 108 in a cool operative condition and avoid inconvenience in handling, as well as combustion of the film by excessive heat. To facilitate this, a detachable hood 116 is mounted over the lamp 103 and lens 108 and, for this purpose, is provided with a forked lug 117 at the bottom to engage a headed pin 118 projecting from the wall 15 below the opening 112 and has an ear 119 at the top with a headed pin or tapered lug 120 to engage through an opening 121 in the wall 15 and with a spring catch 122 held between the wall 15 and a plate 123 mounted at the back of the wall over the opening and held by rivets, screws or the like constituting posts 124. These posts, as shown in Fig. 10 of the drawings, support the spring members of the catch 122 and engage behind the headed pin or lug 120 to detachably secure the hood in position over the lamp 103 and lens 108 but to permit convenient removal thereof for obtaining access to said parts or the wire connections to the socket and contact post of the plug held therein and resiliently pressed toward the contact point of the lamp as is usual in such types of lamps and sockets having the usual pins and bayonet slots for securing the lamp bulb in position. The hood 116 is provided with a series of spaced parallel vertical heat dissipating vanes 125 and a plurality of vertical slots 126 similarly related through the wall thereof, the outer slots being shown shorter than the inner slots. A baffle plate 127 is fastened to the hood at the inside in spaced relation to the front portion thereof with suitable posts or spacing screws 128 providing slots 129 at the sides, which sides are closed at the top due to the plate being flat and turned angularly beneath the top portion of the hood while the top portion as well as the bottom portion are relatively concavo-convex.

This provides a slot 130 between the plate and the top of the hood at the inner or open side thereof so that the current of cool air from the fan passing the film gate at both front and back through opening 46 to absolutely prevent the film 66 from heating, blistering or buckling, and also pass through the openings 112, 113, 114 and 115 may pass into the hood, around the baffle plate at the side slots 129 then out through the slots 126 while some of the air will pass out through the slot 130 to the top of the casing to displace the heated air therein. An opening 131 is provided in the front vertical wall of the hood 116 in front of the lamp 103 and the lens system 108, the adjacent face of the hood being thickened and slanting or beveled toward the inner surface of said wall preferably as shown in Fig. 9 of the drawings and provided with a groove or seat 132 to take a suitable glass panel 133 which is held by a lug 134 at the outside and a sheet metal clip 135 at the inside, which clip is held in position by a screw or other suitable means to render it detachable. A hood 136 is provided at the inside of the case on the wall 15 in back of the hood 116 and the openings through the wall 15 and tapers downwardly in general form with an inclined inner and bottom wall 137 and an enlarged top portion 138 disposed beneath the top opening 22. At the top portion of the hood 136 is a baffle frame 139 having a plurality of inclined parallel baffle plates 140 to deflect the air toward the back of the case above the top thereof and away from the wall 15 and parts mounted thereon as previously described. It is, of course, to be understood that the hood 136 is closed at the sides as well as at its inner side and bottom and beneath the enlarged top portion 138 and is formed with a cut out 141 communicating with the opening 114 adjacent the condensing lens system and bracket 108 so that the heat of the lamp will be deflected out through the same to escape at the top of the inner hood 136 after being forced by the fan through the bottom opening 112 and then upwardly around the lamp and lens system within the outer hood 116, thereby maintaining these parts in a cool and efficiently workable condition.

With the star wheel or Geneva movement previously described using a single arm 77 which engages the abutment edges 72 of the teeth of the feeding cam or star wheel 42 at each revolution of the shaft 79 driven by the motor 87 through the gear train or clock mechanism 84, there is an intermission say of seven seconds between each advancing motion during which the picture is projected and exposed, the advancement taking place intermittently after each exposure. In order to reduce this time duration of exposure, say one-half, a cross arm 142 may be employed as shown in Fig. 13 of the drawings in lieu of the single arm 77. This cross arm is similarly mounted upon the shaft 79 and each arm has a similar pin 78 for engagement with the teeth of the cam wheel 42 so that the latter is advanced each half revolution of the shaft 79 instead of once for each complete revolution. In this way, the time exposure may be reduced to three and one-half seconds between intermittent intervals of advancement.

In the operation of the picture or advertising projecting machine as above described, the film strip is fed around the various rollers and through the film gate between the pressure plates 47 and 52 so as to pass and properly register with the apertures. The switch is then closed to the motors and lamp to cause the light rays to be projected through the picture so that the latter will be projected upon a screen and successively advanced along for display and advertising purposes. As the motor 87 is operated, the crank 77 will be driven through the clockwork or reduction gear 84 to cause the advancing of the film intermittently by reason of the pin 78 striking the abutment edges or surfaces 72 of the star wheel or feeding cam 42 of the intermittent feed formed by the geneva movement. The pin 78 will enter the notches of the star wheel and advance the same one tooth at each revolution of the crank arm 77 with its shaft 79, passing out over the clearance surfaces or edges 73 and the friction of the spring 74 against the hub of the feeding cam 42 will not only cause uniform movement thereof, but check the movement of the film after the arm is passed out of a notch and serve to intermittently hold the wheel against rotation as well as center the pictures or advertising matter in the frames or panels of the film relative to the film gate aperture at all times while the crank is rotated. In this way, the centering spring serves as a brake and insures uniform feeding or advancement of the film. By way of example, it will take approximately eight seconds for the crank arm 77 to rotate a complete revolution, one second of which is used in advancing the film a complete frame or panel so as to present a different picture or advertising panel 67 to view from the film 66 through the aperture 50 and the same exposed for seven seconds of time, which will ordinarily be sufficient for the purpose for which the machine has been designed, which will be for advertising or other display purposes. However, it may be used for ordinary picture projection and with a film of 130 frames, it will take approximately 15 minutes to expose and project the entire film. By using the oppositely extending or cross arm 142 with two pins 78, the film will be advanced each half revolution of the shaft 79 so as to expose the film for approximately three and one-half seconds with an interval between each exposure during which the film is advanced as previously described. In feeding the film through the film gate, it is only necessary to press rearwardly on the finger lip or extension 65 of the pressure plate 52 so that the film may be radially passed between the plates including the fixed aperture plate 47 and the pivoted pressure plate 52 to be held by the spring 56 upon release of the plate 52. It will also be seen that manufacture is greatly facilitated by reason of the mounting and assembly of most of the mechanism upon a single wall or plate forming the panel 15 of the case and that all of the parts are readily accessible for adjustment, repair or replacement. The cooling device especially at the lamp and film gate will maintain the parts in a cool and highly desirable condition so as not to injure the film as well as to facilitate handling thereof by the operator, when necessary.

In the form of the film guide and gate shown in Figs. 14 and 15, the fixed aperture plate 47 is the same as previously described in connection with drawings and especially Figs. 1 to 7, inclusive, and is secured to the outside of the wall or panel plate 15 vertically across the opening 46 to permit the cooling air from the fan 95—97 to pass and keep the film gate and guide as well as the film cool and prevent heating, blistering or buckling of the latter, so that the film or joints, as where the ends of a continuous film are overlapped to join same, from getting caught, jammed, disrupted or broken in moving through the gate, and so as to pass easily and uniformly. A pressure aperture plate 52a corresponding to the pressure plate 52 is the same except that the inner portion is flat as indicated at 52b and the inner edge recessed intermediately as at 52c and the flat portion 52b is spaced as indicated at 62a from the inner margin of the fixed aperture plate 47 to move bodily toward and away from the fixed plate 47 or fulcrum or rock thereon at a flange 48 and the rivets 61. On the other hand, the fixed aperture plate 47, the pressure aperture plate 52a and a pressure spring 56a are apertured or provided with the pairs of holes 60 as previously described to take the hollow rivets 61 which are anchored on the plate 47 while the plate 52a and spring 56a are loose to move, ride and fulcrum thereon to permit the plates to separate from a normal position in which they are held toward each other or together. Also, likewise, the spring 56a and pressure plate 52a are held from displacement on the rivets or pins 61 by upsetting the inner or rear ends of the latter. The pressure spring 56a is loosely or slidably mounted on the fixed plate 47 by the rivets 61 to fulcrum at its inner portion or edge and has an aperture, opening or recess 57a to register with the apertures 50 and 53 in the respective plates 47 and 52a and the outer end or free edge beyond the angular portion or pressure end may be bifurcated, pronged or split to provide spring portions or arms 58a to engage the pressure plate 52a around the aperture 53 or at the inside in the crotch, bifurcation or bight at the inner edge of the aperture or notch and above and below at said spring portions or arms 58a. The opposite inner end or marginal portion of the spring 56a is similarly turned or curved inwardly and forwardly as at 59a to ride on the inner seat portion of the pressure plate 52a and engage the inner attaching portion or flange 48 of the fixed aperture plate 47 adjacent the central or intermediate recesses therein at the opening 46 in the wall 15 as shown in Figs. 3 and 4, and 14 and 15, respectively. This permits the free escape or passage of the current of cool air from the fan 95—97 so that the guide and film will absolutely be kept cool at all times no matter how long the machine runs and the film will therefore not have a chance to heat up, blister, buckle or get caught in the gate or guide. This form is a little more simple and economical.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a picture projecting machine having means for supporting and advancing a film and a film gate to receive the film, said film gate comprising a fixed aperture plate, an apertured pressure plate slidably mounted for movement normal to the fixed plate, fulcrumed at one vertical edge and disposed against the fixed plate and an apertured spring mounted to hold the pressure plate toward the fixed plate and all having apertures in alignment, guide means for the film carried by one plate, said plates having opposed channels in alignment with the apertures and opposed offset portions engaging each other at opposite sides of the apertures therein.

2. In a picture projecting machine having means for supporting and advancing a film and a film gate to receive the film, said film gate comprising a fixed aperture plate, a second aperture plate loosely and movably mounted adjacent one edge against the fixed plate, said plates having film guiding means and a pressure spring loosely and movably mounted on the fixed plate for limited movement away from the same, held from displacement and seated against the second plate to hold the same pressed against the fixed plate.

3. In a picture projecting machine having means for supporting and advancing a film and a film gate to receive the film, said film gate comprising a fixed aperture plate, a second aperture plate loosely mounted at one edge against the fixed plate, said plates having film guiding means and a pressure spring slidably mounted on projections from the fixed plate and seated against the second plate to hold the same pressed against the fixed plate, said plates both having opposed contacting ribs adjacent the apertures thereof to space said plates and permitting a film joint to freely pass without catching or destroying the joint.

4. In a picture projecting machine having means for supporting and advancing a film and a film gate to receive the film, a light source, a condensing lens system between the light source and the aperture of the gate, an objective lens assembly in front of the film gate, said film gate comprising a fixed aperture plate, a second aperture plate loosely mounted at one side against the fixed plate, said plates having film guiding means, interfitting and being disposed in contact adjacent the apertures and spaced apart above and below the apertures, the second plate having an extension beyond the edge of the fixed plate, outstanding rivets on the fixed plate, and a spring mounted to slide on the rivets on the fixed plate and fulcrumed on the inner portion of the second plate and to move therewith on the rivets, said spring holding the second plate toward the fixed plate.

5. A film gate for a picture projector comprising a fixed aperture plate having attaching flanges, a film guide means and a channel with inwardly pressed ribs on opposite sides of the aperture and channel, a movable plate having a bent edge portion seated on the fixed plate adjacent the flanges, a channel in alignment with the aperture and inwardly pressed ribs opposing the aforesaid ribs to space said plates apart above and below the apertures, a spring having a bent end resting against the inner portion of the second plate adjacent its edge portion and the flanges and having an angular free end pressing against the second plate to resiliently hold it toward the fixed plate and an aperture aligned with the aforesaid apertures, and means to mount the spring and second plate on the fixed plate for limited movement toward and away from the fixed plate.

6. A film gate for a picture projector comprising a fixed aperture plate having attaching flanges, a film guide means and a channel with inwardly pressed ribs on opposite sides of the aperture and channel, a movable plate having a bent edge portion seated on the fixed plate adjacent the flanges, a channel in alignment with the aperture and inwardly pressed ribs opposing the aforesaid ribs to space said plates apart above and below the apertures, a spring having a bent end resting against the inner portion of the second plate adjacent its edge portion and the flanges, having an angular free end pressing against the second plate to resiliently hold it toward the fixed plate, said plates and spring having registering apertures and rivets anchored to the fixed plate, passing through the second plate and spring at the apertures to permit fulcruming movement of the second plate and spring thereon.

7. A film gate and guiding means for a picture projecting machine having means for supporting and advancing a film, including fixed and movable apertured guide plates held toward each other, outstanding pins on the fixed plate and a spring having openings movably mounted on the pins and pressing the plates together, said guide plates having openings for passing cooling air from a fan through and along the gate and guiding means and film to prevent heating, blistering or buckling thereof.

8. A film gate and guiding means for picture projecting machines having means for supporting and advancing a film, including apertured guide plates held toward each other, one plate being fixed and the other movable, said movable plate having openings and the fixed plate having pins on which the movable plate is mounted at the openings, and a spring movably mounted on the pins and held from displacement at the free ends thereof, said spring pressing said plates together and being fulcrumed at its inner edge and having bent portions engaging and pressing against the movable plate at the inner and outer portions thereof.

9. A film gate for a picture projector comprising a fixed aperture plate, a movable plate having a bent portion seated on the fixed plate, a spring having a bent end resting against the inner portion of the second plate and having an angular free end pressing against the second plate to resiliently hold it against the first plate, said plates and spring having apertures, and rivets anchored to the first plate, passing through the second plate and spring at the apertures to permit fulcruming movement of the second plate and spring thereon, and the free ends of the rivets being upset to limit the movement of the movable plate and spring away from the first plate.

JOSEPH GUERCIO.